US012665495B2

(12) United States Patent
Yang et al.

(10) Patent No.: US 12,665,495 B2
(45) Date of Patent: Jun. 23, 2026

(54) INTEGRATED CIRCUIT AND CONVERTER HAVING THE SAME

(71) Applicant: Delta Electronics, Inc., Taoyuan City (TW)

(72) Inventors: Zhongwang Yang, Shanghai (CN);
Xueliang Chang, Shanghai (CN);
Mingjie Shan, Shanghai (CN)

(73) Assignee: Delta Electronics, Inc., Taoyuan City (TW)

( * ) Notice: Subject to any disclaimer, the term of this patent is extended or adjusted under 35 U.S.C. 154(b) by 313 days.

(21) Appl. No.: 18/379,264

(22) Filed: Oct. 12, 2023

(65) Prior Publication Data

US 2024/0171067 A1 May 23, 2024

(30) Foreign Application Priority Data

Nov. 21, 2022 (CN) .......................... 202211456326.6

(51) Int. Cl.
*H02M 1/38* (2007.01)
*H02M 3/335* (2006.01)

(52) U.S. Cl.
CPC ....... *H02M 1/385* (2021.05); *H02M 3/33592* (2013.01)

(58) Field of Classification Search
CPC ..... H02M 1/385; H02M 3/33592; H02M 1/38
USPC .......................................................... 363/17
See application file for complete search history.

(56) References Cited

U.S. PATENT DOCUMENTS

| | | | |
|---|---|---|---|
| 4,641,231 A | 2/1987 | Walker et al. | |
| 7,446,513 B2 | 11/2008 | Dikken et al. | |
| 7,800,350 B2 | 9/2010 | Pigott | |
| 7,868,597 B2 | 1/2011 | Dequina | |
| 8,648,583 B2 | 2/2014 | Brown et al. | |
| 9,166,469 B2 | 10/2015 | Familiant et al. | |
| 9,793,792 B2 | 10/2017 | Forscht et al. | |
| 10,468,974 B2 | 11/2019 | Lee et al. | |
| 10,826,480 B1 * | 11/2020 | Nguyen | H03K 19/0185 |
| 11,996,767 B1 | 5/2024 | Qiu et al. | |
| 12,142,931 B1 | 11/2024 | Martinez et al. | |
| 2009/0016083 A1 * | 1/2009 | Soldano | H02M 3/33592 363/20 |
| 2012/0105039 A1 | 5/2012 | Brown | |
| 2014/0320178 A1 | 10/2014 | Hosini et al. | |
| 2015/0263602 A1 | 9/2015 | Drda et al. | |

(Continued)

FOREIGN PATENT DOCUMENTS

| | | |
|---|---|---|
| CN | 102256425 B | 7/2014 |
| CN | 109600029 B | 12/2020 |

(Continued)

*Primary Examiner* — Yemane Mehari
(74) *Attorney, Agent, or Firm* — KIRTON McCONKIE; Evan R. Witt

(57) ABSTRACT

An integrated circuit and a converter having the same are provided. The converter further includes a first switch, and the integrated circuit includes a second switch and a sampling processing circuit. The control signals of the first and second switches are complementary, and the control signal of the second switch has a dead time. The sampling processing circuit is for sampling the voltage on the second switch to obtain a duration of the dead time and generating the digital signal according to the duration of the dead time. The digital signal is used to adjust the duration of the dead time.

18 Claims, 12 Drawing Sheets

(56) References Cited

U.S. PATENT DOCUMENTS

| | | | | |
|---|---|---|---|---|
| 2016/0126822 | A1 | 5/2016 | Lyle et al. | |
| 2020/0363467 | A1 | 11/2020 | Chang et al. | |
| 2021/0167774 | A1* | 6/2021 | Karasawa | H02M 3/015 |
| 2022/0052613 | A1* | 2/2022 | Xu | H02M 3/33515 |
| 2022/0131471 | A1* | 4/2022 | Xiong | H02M 1/38 |
| 2023/0023250 | A1 | 1/2023 | Karasawa | |
| 2023/0231463 | A1* | 7/2023 | Chen | H02M 1/0006 |
| | | | | 323/234 |

FOREIGN PATENT DOCUMENTS

| | | |
|---|---|---|
| CN | 111953211 B | 3/2022 |
| TW | 201531004 A | 8/2015 |
| WO | 9303537 A1 | 2/1993 |
| WO | 2004114509 A1 | 12/2004 |

* cited by examiner

INTEGRATED CIRCUIT AND CONVERTER HAVING THE SAME

CROSS-REFERENCE TO RELATED APPLICATION

This application claims priority to China Patent Application No. 202211456326.6, filed on Nov. 21, 2022, the entire contents of which are incorporated herein by reference for all purposes.

FIELD OF THE INVENTION

The present disclosure relates to an integrated circuit and a converter having the same, more particularly to an integrated circuit and a converter having the same which may control the dead time of switches.

BACKGROUND OF THE INVENTION

In recent years, the issue of energy consumption has been widely concerned by the society, and the subject of energy conservation and environmental protection has received increasing attentions. Therefore, it is important to reduce the loss of power converters to improve the efficiency thereof.

For the half-bridge DC-DC power converter, since both the power device and the printed circuit board have certain parasitic parameters, they may cause some delay of turning on and turning off the power switch. In addition, peripheral circuits such as driving chips may also bring a certain delay to the driving signal. These delays may easily cause the primary and secondary switches of the half-bridge DC-DC power converter to turn on at the same time, resulting in a shoot-through phenomenon. When the shoot-through phenomenon happens, the power supply is directly grounded to generate a considerable short-circuit current, and the power switch would be damaged due to thermal breakdown. Therefore, to avoid the shoot-through phenomenon of the switch, it is necessary to introduce a dead time into the control signal of the switch.

In addition, in the conventional half-bridge DC-DC converter, diodes are used on the secondary side for recertification. However, the diode has the disadvantage of high forward conduction voltage drop. When the rectification current is large, the conduction loss of the diode cannot be ignored and would affect the overall efficiency of the converter. To address this issue, synchronous rectification technology emerges. The synchronous rectification technology uses MOSFET as synchronous rectification device and takes the advantage of the small on-resistance of MOSFET to greatly reduce the power loss of synchronous rectification device, thereby improving the efficiency of the converter. Nevertheless, since the MOSFET is an active switch, the MOSFET needs to be provided with an appropriate control signal to ensure the normal operation of the converter. The traditional control for the dead time in the control signal has still some difficulties in the application of synchronous rectification technology. If the control for the dead time is not accurate enough, the efficiency of the converter will not be maximized, even the current from the secondary side may flow back to the primary side, which makes the converter unable to work normally.

SUMMARY OF THE INVENTION

The present disclosure provides an integrated circuit and a converter having the same, the duration of the dead time in the control signal of the switch of the integrated circuit is obtained through sampling the voltage on the switch, and the digital signal is generated accordingly. Therefore, the duration of the dead time can be controlled and adjusted based on the digital signal, thereby reducing the loss caused by the dead time and improving the efficiency of the converter.

In accordance with an aspect of the present disclosure, an integrated circuit applicable for a converter including a first switch is provided. The integrated circuit includes a second switch and a sampling processing circuit. A control signal of the second switch and a control signal of the first switch are complementary, and the control signal of the second switch has a dead time. The sampling processing circuit is for sampling a voltage on the second switch to obtain a duration of the dead time and generating a digital signal according to the duration of the dead time. The digital signal is used to adjust the duration of the dead time.

In accordance with another aspect of the present disclosure, a converter is further provided. The converter includes a positive input terminal, a negative input terminal, a positive output terminal, a negative output terminal, a first switch and an integrated circuit. The positive input terminal and the negative input terminal are configured to receive an input signal, and the positive output terminal and the negative output terminal are configured to output an output signal. The first switch is electrically connected to the positive input terminal. The integrated circuit includes a second switch and a sampling processing circuit. A control signal of the second switch and a control signal of the first switch are complementary, and the control signal of the second switch has a dead time. The sampling processing circuit is for sampling a voltage on the second switch to obtain a duration of the dead time and generating a digital signal according to the duration of the dead time. The digital signal is used to adjust the duration of the dead time. The second switch of the integrated circuit is electrically connected to the negative output terminal, and the converter is configured to convert the input signal into the output signal.

The above contents of the present disclosure will become more readily apparent to those ordinarily skilled in the art after reviewing the following detailed description and accompanying drawings, in which:

DETAILED DESCRIPTION OF THE INVENTION

The present disclosure will now be described more specifically with reference to the following embodiments. It is to be noted that the following descriptions of exemplary embodiments of this disclosure are presented herein for purpose of illustration and description only. It is not intended to be exhaustive or to be limited to the precise form disclosed.

Figure 1:
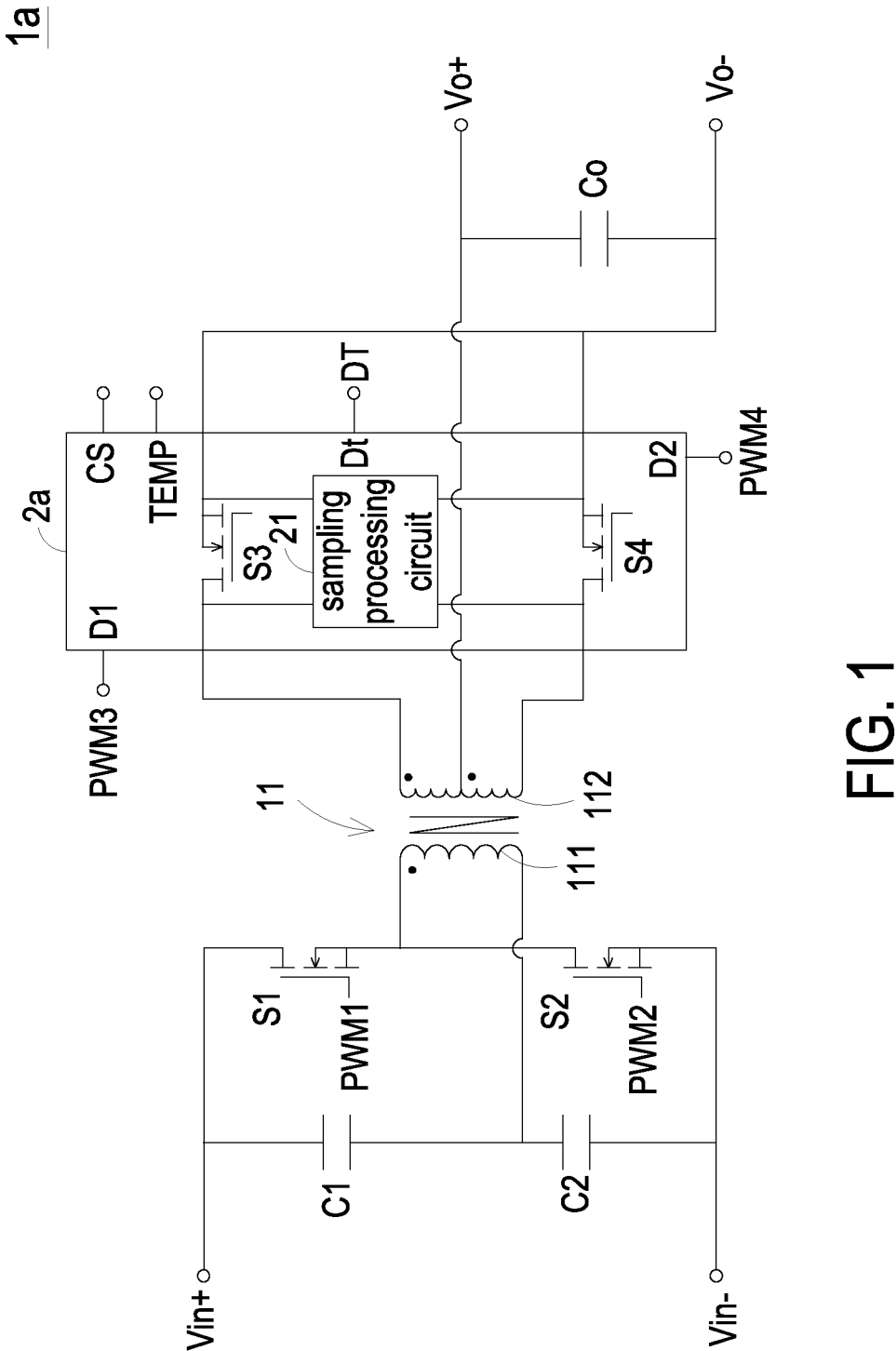
FIG. 1 is a schematic circuit diagram illustrating a converter and an integrated circuit thereof according to a first embodiment of the present disclosure.

Please refer to FIG. 1. FIG. 1 is a schematic circuit diagram illustrating a converter and an integrated circuit thereof according to a first embodiment of the present disclosure. As shown in FIG. 1, in this embodiment, a converter 1*a* may be a half-bridge DC-DC converter. The half-bridge DC-DC converter includes a positive input terminal Vin+, a negative input terminal Vin−, a first primary switch S1, a second primary switch S2, a transformer 11, an integrated circuit 2*a*, a positive output terminal Vo+, and a negative output terminal Vo−. The positive input terminal Vin+ and the negative input terminal Vin− are configured to receive an input signal, the positive output terminal Vo+ and the negative output terminal Vo− are configured to output an output signal, and the converter 1*a* is configured to convert the input signal into the output signal. The first primary switch S1 and the second primary switch S2 are electrically connected in series between the positive input terminal Vin+ and the negative input terminal Vin−. And the first primary switch S1 and the second primary switch S2 are electrically connected to the positive input terminal Vin+ and the negative input terminal Vin− respectively. The transformer 11 includes a primary winding 111 and a secondary winding 112, and a first terminal of the primary winding 111 is electrically connected to a junction node between the first primary switch S1 and the second primary switch S2. The transformer 11 is for example but not limited to an isolated transformer. In an embodiment, the converter 1*a* further includes input capacitors C1 and C2. The input capacitors C1 and C2 are electrically connected in series between the positive input terminal Vin+ and the negative input terminal Vin−. A capacitor bridge arm formed by the input capacitors C1 and C2 is connected in parallel to a switch bridge arm formed by the first primary switch S1 and the second primary switch S2. A second terminal of the primary winding 111 of the transformer 11 is electrically connected to a junction node between the input capacitors C1 and C2. In an embodiment, the converter 1*a* further includes an output capacitor Co. The output capacitor Co is electrically connected between the positive output terminal Vo+ and the negative output terminal Vo−.

Figure 2:
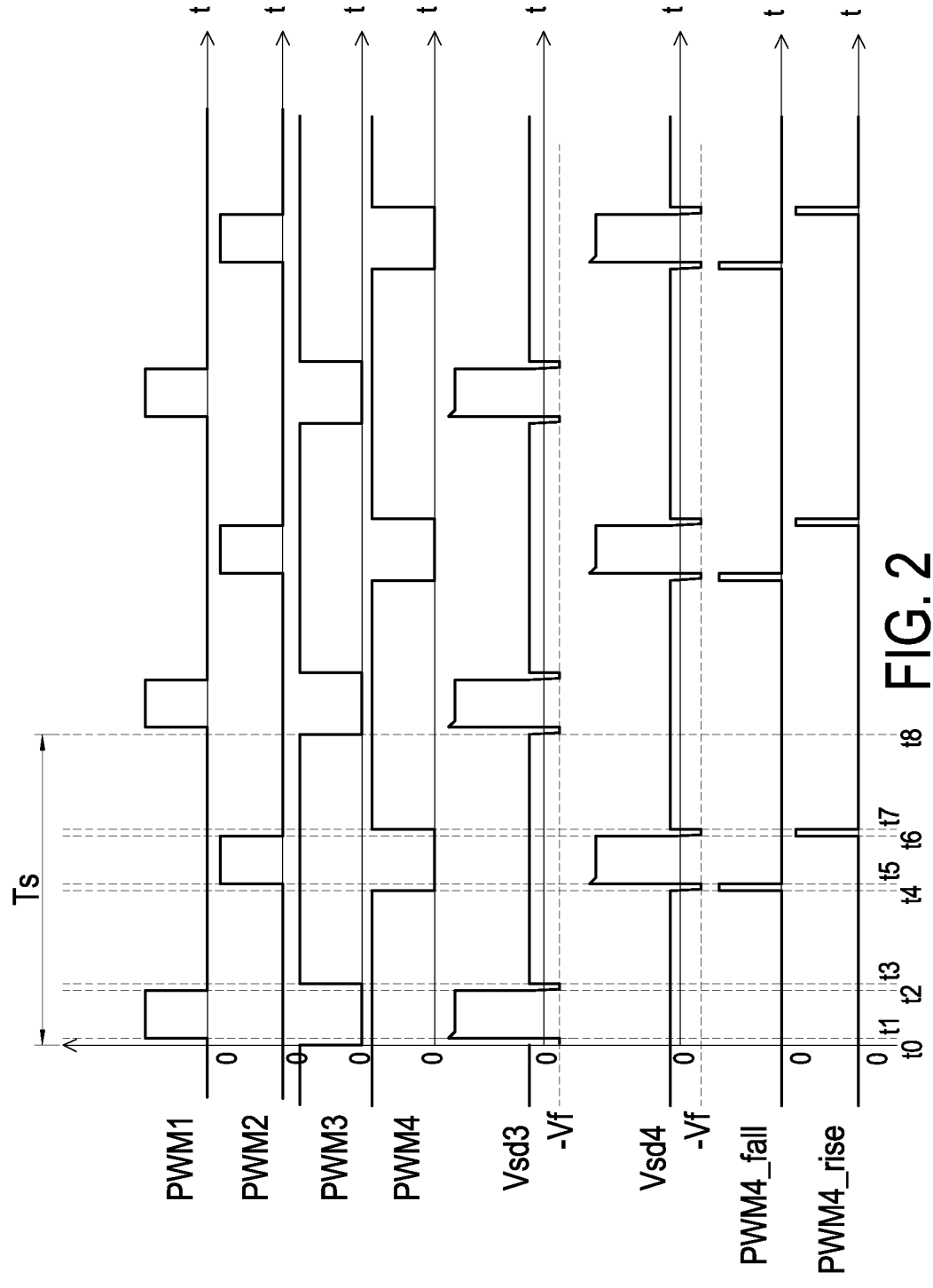
FIG. 2 is a schematic timing waveform diagram illustrating associated voltage signals and PWM signals in the converter of FIG. 1.

The integrated circuit 2*a* includes a first secondary switch S3, a second secondary switch S4 and a sampling processing circuit 21. The integrated circuit 2*a* is integrated in one chip so that the impact of the noise on the sampling precision of the sampling processing circuit 21 may be greatly reduced. The first secondary switch S3 and the second secondary switch S4 are configured for secondary-side synchronous rectification. The first secondary switch S3 is electrically connected between a first terminal of the secondary winding 112 and the negative output terminal Vo−, and a second terminal of the secondary winding 112 is electrically connected to the positive output terminal Vo+. The second secondary switch S4 is electrically connected between a third terminal of the secondary winding 112 and the negative output terminal Vo−. Moreover, as shown in FIG. 2, a control signal PWM3 of the first secondary switch S3 and a control signal PWM1 of the first primary switch S1 are complementary and the control signal PWM3 of the first secondary switch S3 has a first dead time, and a control signal PWM4 of the second secondary switch S4 and a control signal PWM2 of the second primary switch S2 are complementary and the control signal PWM4 of the second secondary switch S4 has a second dead time. The sampling processing circuit 21 samples the voltage on the first secondary switch S3 to obtain the duration of the first dead time of the control signal PWM3 (i.e., the dead time corresponding to the first secondary switch S3), and samples the voltage on the second secondary switch S4 to obtain the duration of the second dead time of the control signal PWM4 (i.e., the dead time corresponding to the second secondary switch S4). According to the duration of the first dead time corresponding to the first secondary switch S3 and the duration of the second dead time corresponding to the second secondary switch S4, the sampling processing circuit 21 generates a digital signal DT. The digital signal DT is used to precisely control and adjust the duration of the first dead time corresponding to the first secondary switch S3 and the duration of the second dead time corresponding to the second secondary switch S4 for reducing the loss caused by the dead time and improving the efficiency of the converter 1*a*.

The switches of converter 1*a* are for example but not limited to MOSFETs (metal-oxide-semiconductor field-effect transistors), IGBTs (insulated gate bipolar transistors), SiC (silicon carbide) transistors or GaN (gallium nitride) transistors. In this embodiment, as an example, the switches of the converter 1*a* are MOSFETs. The drain and source of the first secondary switch S3 are electrically connected to the first terminal of the secondary winding 112 and the negative output terminal Vo− respectively. The drain and source of the second secondary switch S4 are electrically connected to the third terminal of the secondary winding 112 and the negative output terminal Vo− respectively. Correspondingly, the voltage on the first secondary switch S3 and the voltage on the second secondary switch S4 sampled by the sampling processing circuit 21 are the source-drain voltage Vsd3 of the first secondary switch S3 and the source-drain voltage Vsd4 of the second secondary switch S4.

In an embodiment, the integrated circuit 2*a* has two driving pins D1 and D2. The driving pins D1 and D2 are electrically connected to gates of the first secondary switch S3 and the second secondary switch S4 respectively. The two driving pins D1 and D2 are configured to receive the control signals PWM3 and PWM4 and provide the control signals PWM3 and PWM4 to the first secondary switch S3 and the second secondary switch S4 respectively. In an embodiment, the integrated circuit 2*a* has two drain pins (not shown), and the drains of the first secondary switch S3 and the second secondary switch S4 are electrically connected to the first and third terminals of the secondary winding 112 through the two drain pins respectively. In an embodiment, the integrated circuit 2*a* has a digital signal pin Dt electrically connected to the sampling processing circuit 21, and the digital signal pin Dt is configured to output the digital signal DT to an external controller.

In an embodiment, the sampling processing circuit 21 includes a current sampling circuit (not shown), and the integrated circuit 2a has a current pin CS electrically connected to the current sampling circuit. The current sampling circuit samples the current flowing through the first secondary switch S3 and the current flowing through the second secondary side switch S4 and generates a current signal. The current pin CS is configured to output the current signal. In an embodiment, the sampling processing circuit 21 includes a temperature detection circuit (not shown), and the integrated circuit 2a has a temperature pin TEMP electrically connected to the temperature detection circuit. The temperature detection circuit detects temperatures of the first secondary switch S3 and the secondary switch S4 to generate a temperature signal. The temperature pin TEMP is configured to output the temperature signal.

Please refer to FIG. 2. FIG. 2 is a schematic timing waveform diagram illustrating associated voltage signals and PWM signals in the converter of FIG. 1. As shown in FIG. 2, the control signals PWM1 and PWM3 are complementary to each other, and the control signals PWM2 and PWM4 are complementary to each other. The period from time t0 to t8 is one switching cycle Ts. Taking the second secondary switch S4 as an example, when the control signal PWM4 is at high level (from time t0 to t4 as shown in FIG. 2), the rectification current flows through a conduction channel of the second secondary switch S4, and thus the source-drain voltage Vsd4 of the second secondary switch S4 is equal to a voltage drop formed by the rectification current flowing through the on-resistance of the second secondary switch S4. At time t4, that is, when the control signal PWM4 changes from high level to low level, the conduction channel of the second secondary switch S4 turns off. Since the current still flows through the body diode of the second secondary switch S4, the source-drain voltage Vsd4 of the second secondary switch S4 is equal to the forward conduction voltage drop (represented by −Vf) of the body diode. Afterwards, the second secondary switch S4 turns off due to reverse bias. At time t6, the second primary switch S2 is turned off, and the second secondary switch S4 is subjected to forward bias. During the period from time t6 to t7, since the control signal PWM4 is still at low level, the rectification current flows through the body diode of the second secondary switch S4, and the source-drain voltage Vsd4 of the second secondary switch S4 is equal to the forward conduction voltage drop (−Vf) of the body diode. At time t7, the control signal PWM4 changes from low level to high level, and the source-drain voltage Vsd4 of the second secondary switch S4 is equal to the voltage drop formed by the rectification current flowing through the on-resistance of the second secondary switch S4. In this switching cycle Ts, the period from time t4 to t5 is the dead time at the falling edge of the control signal PWM4, and the period from time t6 to t7 is the dead time at the rising edge of the control signal PWM4. The sampling processing circuit 21 generates two pulse signals PWM4_fall and PWM4_rise by sampling the source-drain voltage Vsd4 of the second secondary switch S4. The pulse signal PWM4_fall reflects the duration of the dead time at the falling edge of the control signal PWM4, and the pulse signal PWM4_rise reflects the duration of the dead time at the rising edge of the control signal PWM4.

The operation of the first secondary switch S3 is similar to that of the second secondary switch S4, and thus the detailed descriptions thereof are omitted herein. Similarly, the sampling processing circuit 21 generates two pulse signals PWM3_fall and PWM3_rise by sampling the source-drain voltage Vsd3 of the first secondary switch S3. The pulse signal PWM3_fall reflects the duration of the dead time at the falling edge of the control signal PWM3, and the pulse signal PWM3_rise reflects the duration of the dead time at the rising edge of the control signal PWM3.

Figure 3:
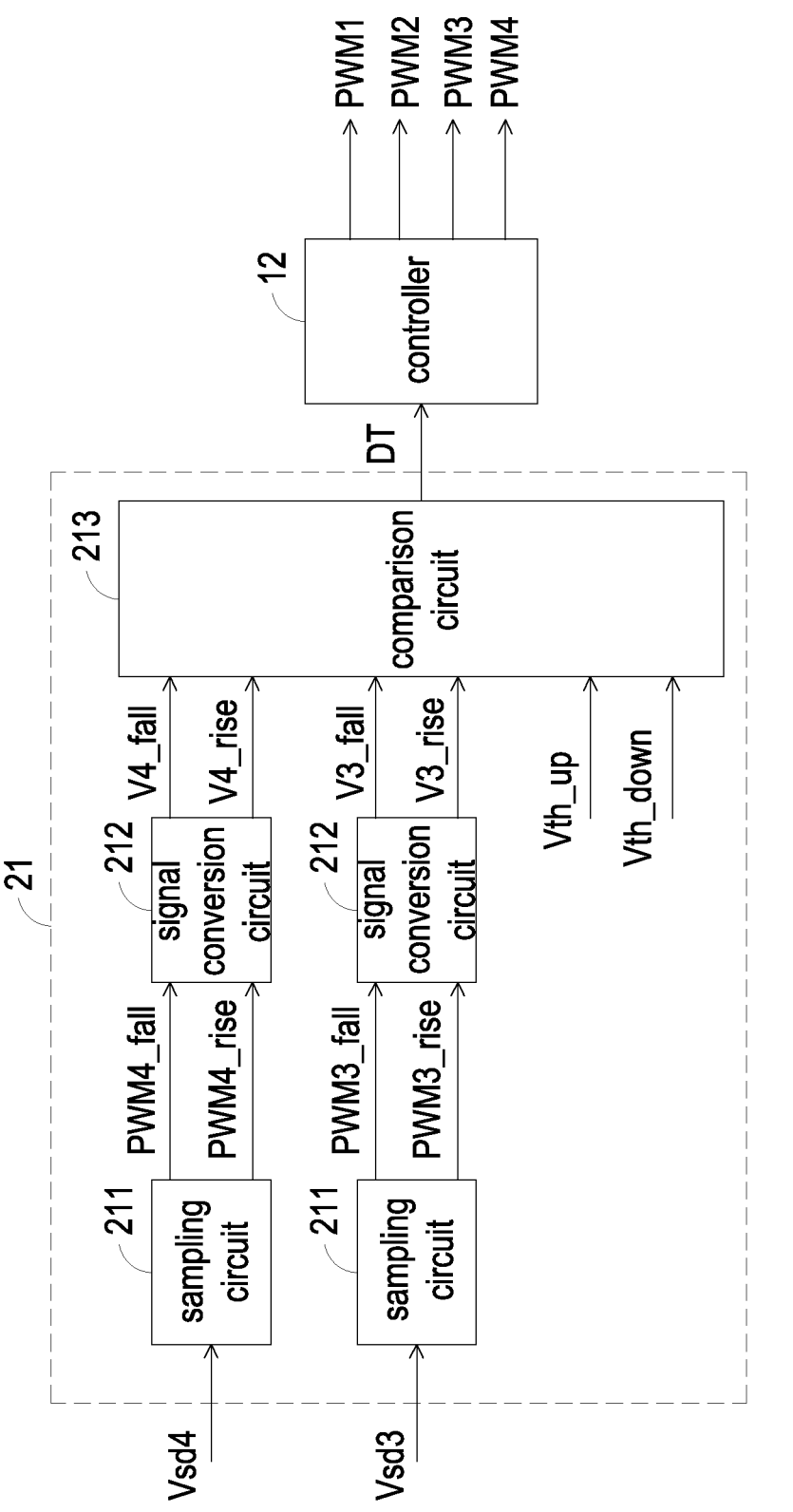
FIG. 3 is a schematic circuit diagram illustrating the sampling processing circuit and the controller of the converter of FIG. 1.

Please refer to FIG. 3. FIG. 3 is a schematic circuit diagram illustrating the sampling processing circuit and the controller of the converter of FIG. 1. As shown in FIG. 3, the sampling processing circuit 21 includes a sampling circuit 211, a signal conversion circuit 212 and a comparison circuit 213 electrically connected to each other. The sampling circuit 211 samples the voltage on the switch of the integrated circuit 2a to generate the pulse signal of the duration of the dead time of the control signal of the switch. The signal conversion circuit 212 converts the pulse signal into a voltage signal reflecting the duration of the dead time. The comparison circuit 213 compares the voltage signal with a threshold to generate the digital signal DT. A controller 12 of the converter 1a is electrically connected to the comparison circuit 213, and the controller 12 adjusts the control signal of the switch of the converter 1a according to the digital signal DT, thereby adjusting the duration of the dead time.

In this embodiment, the sampling processing circuit 21 includes two sampling circuits 211 and two signal conversion circuits 212. In the sampling circuit 211 and signal conversion circuit 212 corresponding to the first secondary switch S3, the sampling circuit 211 samples the source-drain voltage Vsd3 of the first secondary switch S3 to generate two pulse signals PWM3_fall and PWM3_rise, and the conversion circuit 212 converts the two pulse signals PWM3_fall and PWM3_rise into voltage signals V3_fall and V3_rise respectively and provides the voltage signals V3_fall and V3_rise to the comparison circuit 213. Similarly, in the sampling circuit 211 and signal conversion circuit 212 corresponding to the second secondary switch S4, the sampling circuit 211 samples the source-drain voltage Vsd4 of the second secondary switch S4 to generate two pulse signals PWM4_fall and PWM4_rise, and the signal conversion circuit 212 converts the two pulse signals PWM4_fall and PWM4_rise into voltage signals V4_fall and V4_rise respectively and provides the voltage signals V4_fall and V4_rise to the comparison circuit 213. Each of the voltage signals V3_fall, V3_rise, V4_fall and V4_rise reflects the duration of the corresponding dead time. In fact, the number of the sampling circuit 211 and the signal conversion circuit 212 is not limited and may correspond to the number of the switches of the integrated circuit 2a. Alternatively, the sampling and signal conversion operation may be realized by one sampling circuit 211 and one signal conversion circuit 212.

In addition, in this embodiment, the signal conversion circuit 212 is an integrator circuit which converts the pulse signal into the voltage signal through integrating operation. The magnitude of the voltage signal is proportional to the duration of the dead time. For example, the larger the voltage signal is, the longer the duration of the dead time is. On the contrary, the less the voltage signal is, the shorter the duration of the dead time is. Nevertheless, the implementation of the signal conversion circuit 212 is not limited thereto and can be any circuit capable of converting the pulse signal into the voltage signal reflecting the duration of the dead time.

The comparison circuit 213 receives all the voltage signals V3_fall, V3_rise, V4_fall, and V4_rise, compares each voltage signal with an upper threshold Vth_up and a lower threshold Vth_down, and generates the digital signal DT according to all comparison results. The controller 12 of the converter 1a controls the control signals PWM1, PWM2, PWM3, and PWM4 of all the switches according to the digital signal DT so as to adjust the duration of each dead time.

Figure 4A:
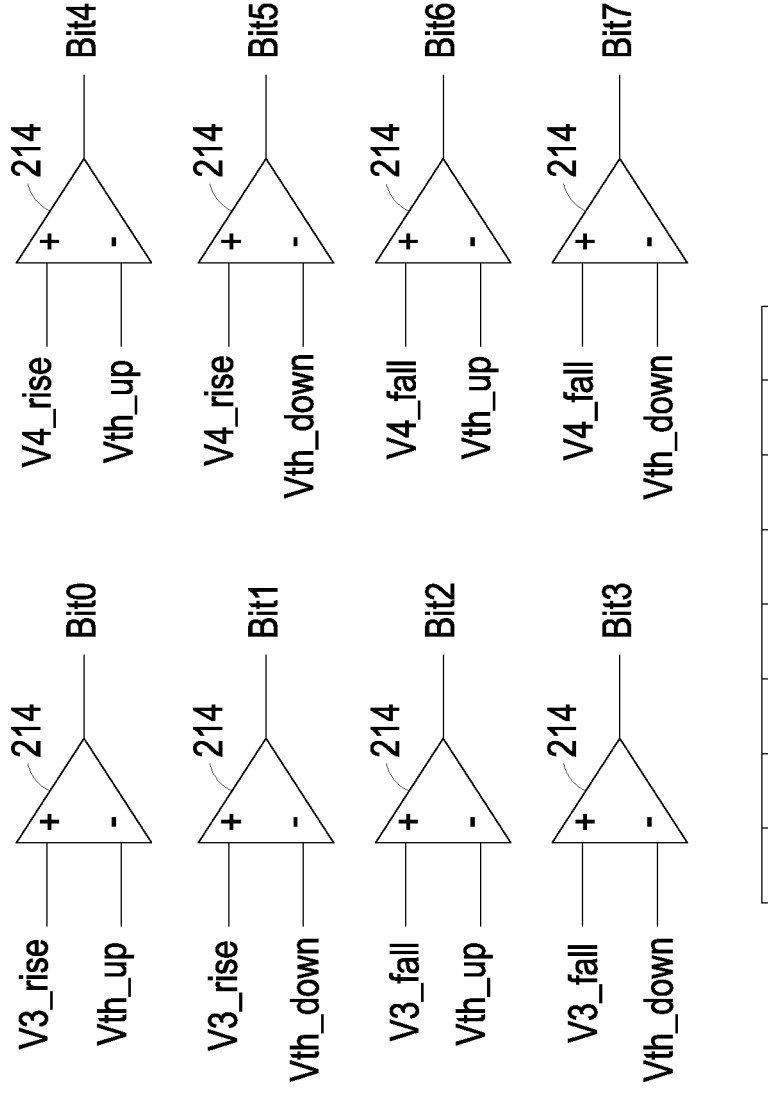
FIGS. 4A and 4B schematically show the operating principle of one embodiment of the comparison circuit of FIG. 3.
Figure 4B:
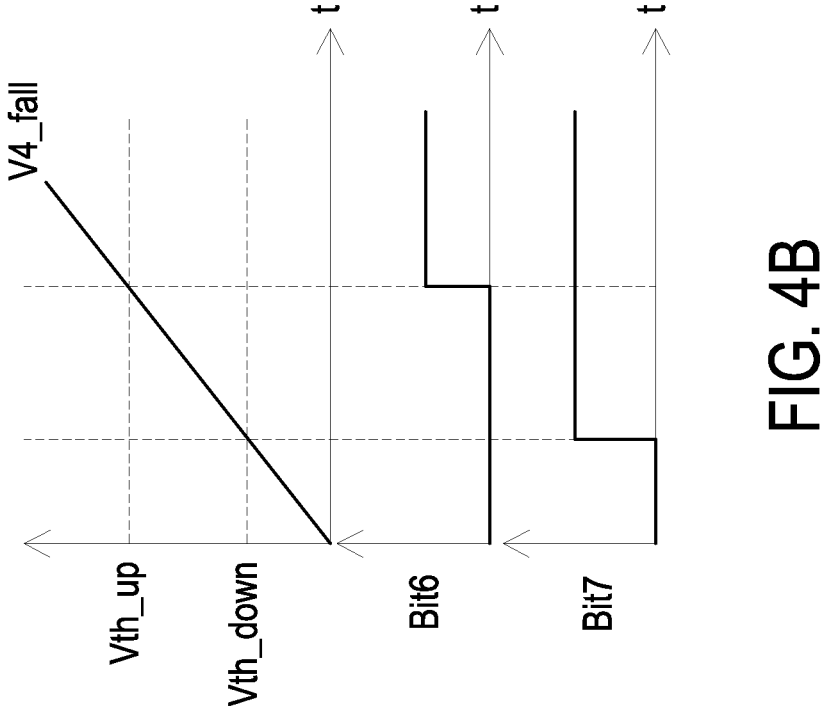

Please refer to FIGS. 4A and 4B. FIGS. 4A and 4B schematically show the operating principle of one embodiment of the comparison circuit of FIG. 3, in which every bit of the digital signal DT is shown. As shown in FIG. 4A, the comparison circuit 213 includes a comparator 214 and a register 215. The comparator 214 is configured to compare the voltage signal with the threshold and generate a dead-time regulating command according to the comparison result. The deadtime regulating command is stored in the register 215, and the digital signal DT generated by the comparison circuit 213 includes all the deadtime regulating commands in the register 215.

In this embodiment, the comparison circuit 213 includes eight comparators 214 and an eight-bit register 215. Each comparator 214 compares the corresponding voltage signal (V3_fall, V3_rise, V4_fall or V4_rise) with the corresponding threshold (Vth_up or Vth_down) to generate the deadtime regulating command, which is stored in the corresponding bit (Bit0, Bit1, Bit2, Bit3, Bit4, Bit5, Bit6 or Bit7) in the register 215. The corresponding voltage signal, threshold, and bit of each of the eight comparators 214 are shown in FIG. 4A. Accordingly, in the register 215, the deadtime regulating command (Bit0, Bit1) represented by the bits Bit0 and Bit1 corresponds to the dead time at the rising edge of the control signal PWM3, the deadtime regulating command (Bit2, Bit3) represented by the bits Bit2 and Bit3 corresponds to the dead time at the falling edge of the control signal PWM3, the deadtime regulating command (Bit4, Bit5) represented by the bits Bit4 and Bit5 corresponds to the dead time at the rising edge of the control signal PWM4, and the deadtime regulating command (Bit6, Bit7) represented by the bits Bit6 and Bit7 corresponds to the dead time at the falling edge of the control signal PWM4. All the bits (i.e., all the deadtime regulating commands) in the register 215 are combined as the digital signal DT.

Based on the digital signal DT, the controller 12 adjusts the duration of each dead time by controlling the control signal of each switch. Since the adjustment manners for the respective duration of different dead times are similar, the dead time at the falling edge of the control signal PWM4 is exemplified herein. As shown in FIG. 4B and Table 1, the upper threshold Vth_up is greater than the lower threshold Vth_down. When the corresponding voltage signal V4_fall is less than the lower threshold Vth_down, the bits Bit6 and Bit7 are both 0, the corresponding deadtime regulating command is (0, 0), and the controller 12 increases the duration of the dead time accordingly. When the voltage signal V4_fall is between the lower threshold Vth_down and the upper threshold Vth_up, the bit Bit6 is 0 and the bit Bit7 is 1, and the corresponding deadtime regulating command is (0, 1). Under this circumstance, the controller 12 does not adjust the duration of the dead time, that is, the current duration of the dead time is maintained. When the voltage signal V4_fall is greater than the upper threshold Vth_up, the bits Bit6 and Bit7 are both 1, the corresponding deadtime regulating command is (1, 1), and the controller 12 decreases the duration of the dead time accordingly.

TABLE 1

| deadtime regulating command | the action executed by the controller of the converter |
| --- | --- |
| (0, 0) | increasing the duration of the dead time |
| (0, 1) | maintaining the current duration of the dead time |
| (1, 1) | decreasing the duration of the dead time |

Figure 5:
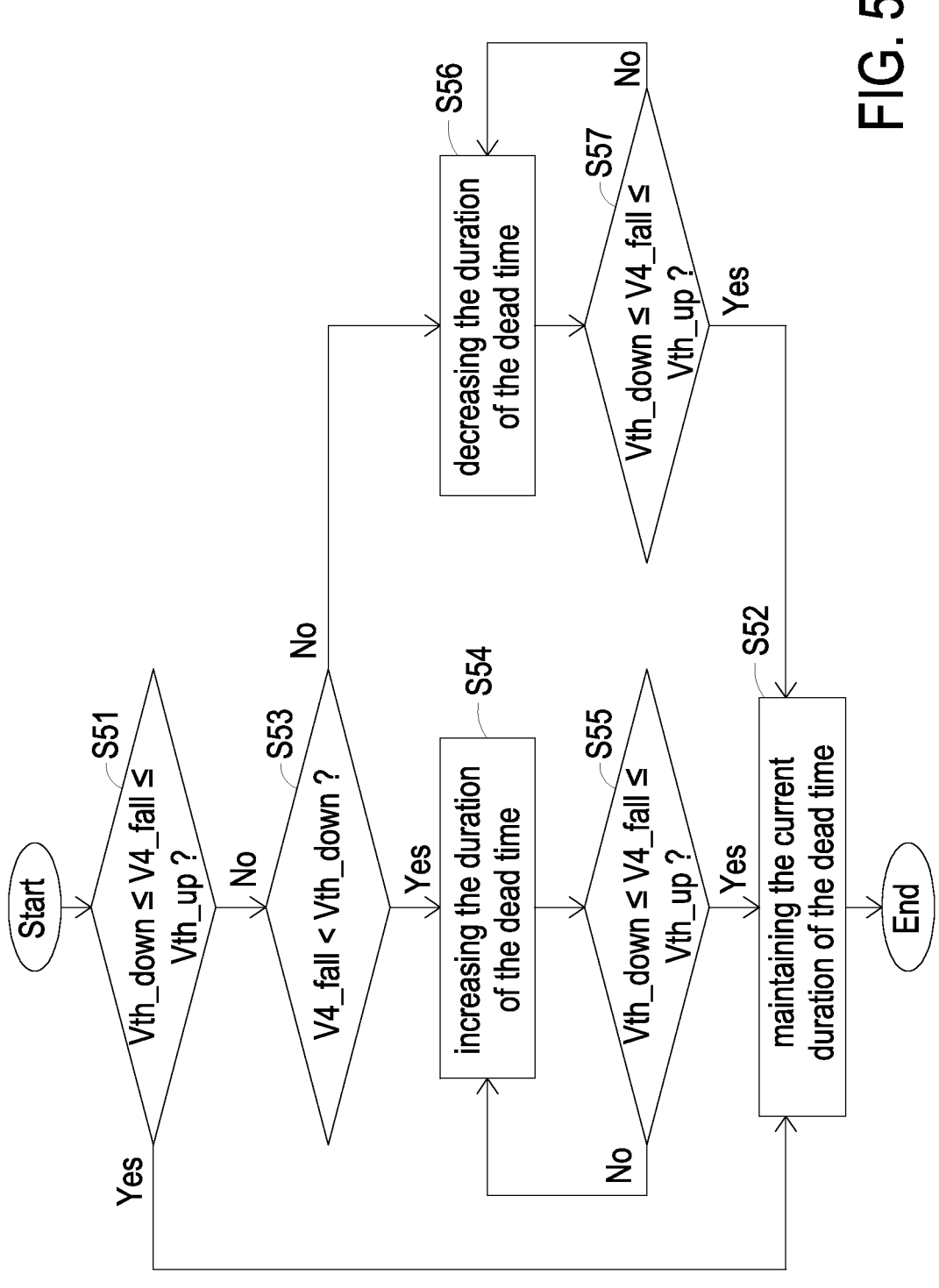
FIG. 5 is a schematic flow chart of adjusting the duration of the dead time based on the voltage signal.

The corresponding adjustment process is exemplified in FIG. 5, in which the dead time at the falling edge of the control signal PWM4 is taken as an example. First, it is determined whether the corresponding voltage signal V4_fall is between the lower threshold Vth_down and the upper threshold Vth_up (step S51). If the determination result is 'Yes', that is, the voltage signal V4_fall is between the lower threshold Vth_down and the upper threshold Vth_up, the current duration of the dead time is maintained (step S52). If the determination result is 'No', that is, the voltage signal V4_fall is less than the lower threshold Vth_down or greater than the upper threshold Vth_up, it is further determined whether the voltage signal V4_fall is less than the lower threshold Vth_down (step S53).

If the determination result of step S53 is 'Yes', that is, the voltage signal V4_fall is less than the lower threshold Vth_down, and the duration of the dead time is increased by the controller (step S54). Afterwards, it is determined whether the voltage signal V4_fall is between the lower threshold Vth_down and the upper threshold Vth_up (step S55). If the determination result of step S55 is 'Yes', the current duration of the dead time is maintained (step S52). If the determination result of step S55 is 'No', the duration of the dead time continues to increase (step S54). Accordingly, when the voltage signal V4_fall is less than the lower threshold Vth_down, the dead time would be gradually increased until the voltage signal V4_fall is between the lower threshold Vth_down and the upper threshold Vth_up.

If the determination result of step S53 is 'No', that is, the voltage signal V4_fall is greater than the upper threshold Vth_up, the duration of the dead time is decreased by the controller (step S56). Then, it is determined whether the voltage signal V4_fall is between the lower threshold Vth_down and the upper threshold Vth_up (step S57). If the determination result of step S57 is 'Yes', the current duration of the dead time is maintained (step S52). If the determination result of step S57 is 'No', the duration of the dead time continues to decrease (step S56). Accordingly, when the voltage signal V4_fall is greater than the upper threshold Vth_up, the dead time would be gradually decreased until the voltage signal V4_fall is between the lower threshold Vth_down and the upper threshold Vth_up.

Further, when the duration of the dead time is increased or decreased (steps S54 and S56), each time the adjustment step size is Vstep, which is less than the difference between the lower threshold Vth_down and the upper threshold Vth_up. The magnitude of the adjustment step size Vstep may be determined according to the switching frequency of the converter 1a and the duration of each dead time. Thereby, the precise control and adjustment for the duration of the dead time are realized to reduce the loss caused by the dead time and to improve the efficiency of the converter.

Figure 6A:
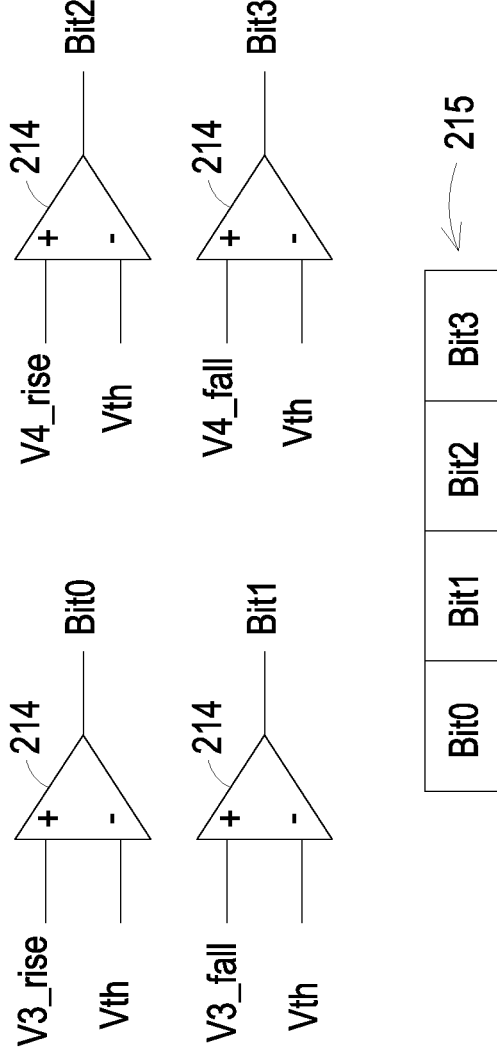
FIGS. 6A and 6B schematically show the operating principle of an alternative embodiment of the comparison circuit of FIG. 3.
Figure 6B:
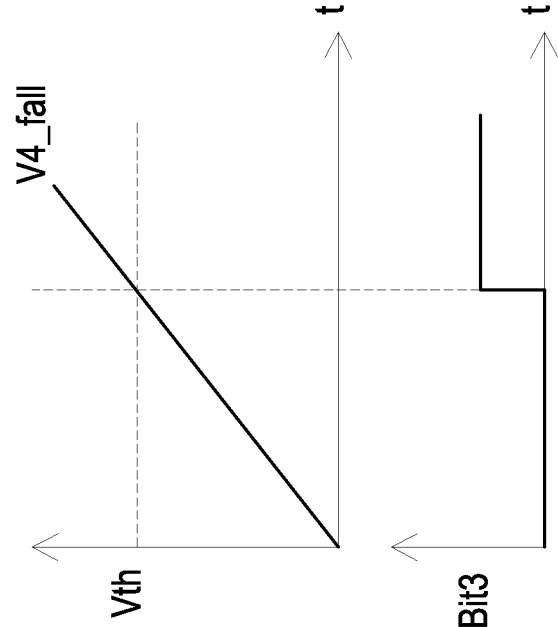

In the foregoing embodiments, the threshold for comparing with the voltage signal may include the upper threshold Vth_up and the lower threshold Vth_down, and the digital signal DT is used to adjust the duration of the dead time until the duration of dead time falls within a preset range. Here, the preset range is defined by the lower threshold Vth_down and the upper threshold Vth_up. However, the present disclosure is not limited thereto. In another embodiment, the threshold for comparing with the voltage signal may include a threshold Vth, and the digital signal generated correspondingly is used to adjust the duration of the dead time until the duration of the dead time is substantially equal to a preset duration. FIGS. 6A and 6B schematically show the operating principle of an alternative embodiment of the comparison circuit of FIG. 3, in which every bit of the digital signal DT is shown. As shown in FIG. 6A, the comparison circuit 213 includes four comparators 214 and a four-bit register 215. The four comparators 214 compare the threshold Vth with the voltage signals V3_rise, V3_fall, V4_rise, and V4_fall respectively to generate the deadtime regulating commands. The deadtime regulating commands are stored in the bits Bit0, Bit1, Bit2, and Bit3 in the register 215 respectively. The deadtime regulating command represented by the bit Bit0 corresponds to the dead time at the rising edge of the control signal PWM3, the deadtime regulating command represented by the bit Bit1 corresponds to the dead time at the falling edge of the control signal PWM3, the deadtime regulating command represented by the bit Bit2 corresponds to the dead time at the rising edge of the control signal PWM4, and the deadtime regulating command represented by bit Bit3 corresponds to the dead time at the falling edge of the control signal PWM4.

As shown in FIG. 6B, the dead time at the falling edge of the control signal PWM4 is taken as an example. When the corresponding voltage signal V4_fall is less than the threshold Vth, the bit Bit3 is 0, and the controller 12 increases the duration of the dead time. When the voltage signal V4_fall is greater than the threshold Vth, the bit Bit3 is 1, and the controller 12 decreases the duration of the dead time. Further, in this embodiment, hysteresis design (e.g., executed by a hysteresis circuit of the comparator 214) may be incorporated into the comparison between the voltage signal and the threshold Vth to prevent frequent fluctuations of the voltage signal around the threshold Vth.

In addition, in the foregoing embodiments, for each control signal, two voltage signals are used to reflect the durations of the dead times at the rising and falling edges respectively, however, the present disclosure is not limited thereto. In some other embodiments, the durations of the dead times at the rising and falling edges may be reflected by one voltage signal.

In the comparison circuit 213, the number of comparators 214 and the number of the bits of register 215 are not limited to the example shown in the figures, and they depend on the number of voltage signals and thresholds used by the comparison circuit 213 for comparison. For example, the number of comparators 214 is equal to the product of the number of the voltage signals and the number of the thresholds, and the number of the bits of register 215 is equal to the number of comparators 214. For example, in the embodiment shown in FIG. 4A, the comparison circuit 213 compares the four voltage signals V3_rise, V3_fall, V4_rise, and V4_fall with the upper threshold Vth_up and the lower threshold Vth_down, and thus the number of comparators 214 and the number of the bits of registers 215 are both equal to eight. In the embodiment shown in FIG. 6A, the comparison circuit 213 compares the four voltage signals V3_rise, V3_fall, V4_rise, and V4_fall with the threshold Vth, and thus the number of comparators 214 and the number of bits of register 215 are both equal to four.

Moreover, in the converter, if the switches which are not included in the integrated circuit are regarded as first switches, and the switches of the integrated circuit are regarded as second switches, the number of the first switches and the number of the second switches are not limited to two as exemplified in the aforementioned embodiments actually and may be any positive integer. When the converter includes a plurality of first switches, the integrated circuit may include a plurality of second switches corresponding to the plurality of first switches respectively. The control signals of the corresponding first and second switches are complementary to each other, and the control signal of the second switch has a dead time. The sampling processing circuit samples the voltage on each second switch to obtain the duration of the dead time corresponding to the second switch, and generates a digital signal according to the durations of the dead times corresponding to all the second switches. The digital signal is used to adjust the durations of the dead times corresponding to all the second switches. The specific adjustment manner is similar to the above description, and thus the detailed descriptions thereof are omitted herein.

In addition, the specific circuit topology of the converter in the present disclosure is not limited to the topologies shown in the foregoing embodiments. Two alternative converter topologies are further exemplified as follows, but the present disclosure is not limited thereto.

Figure 7:
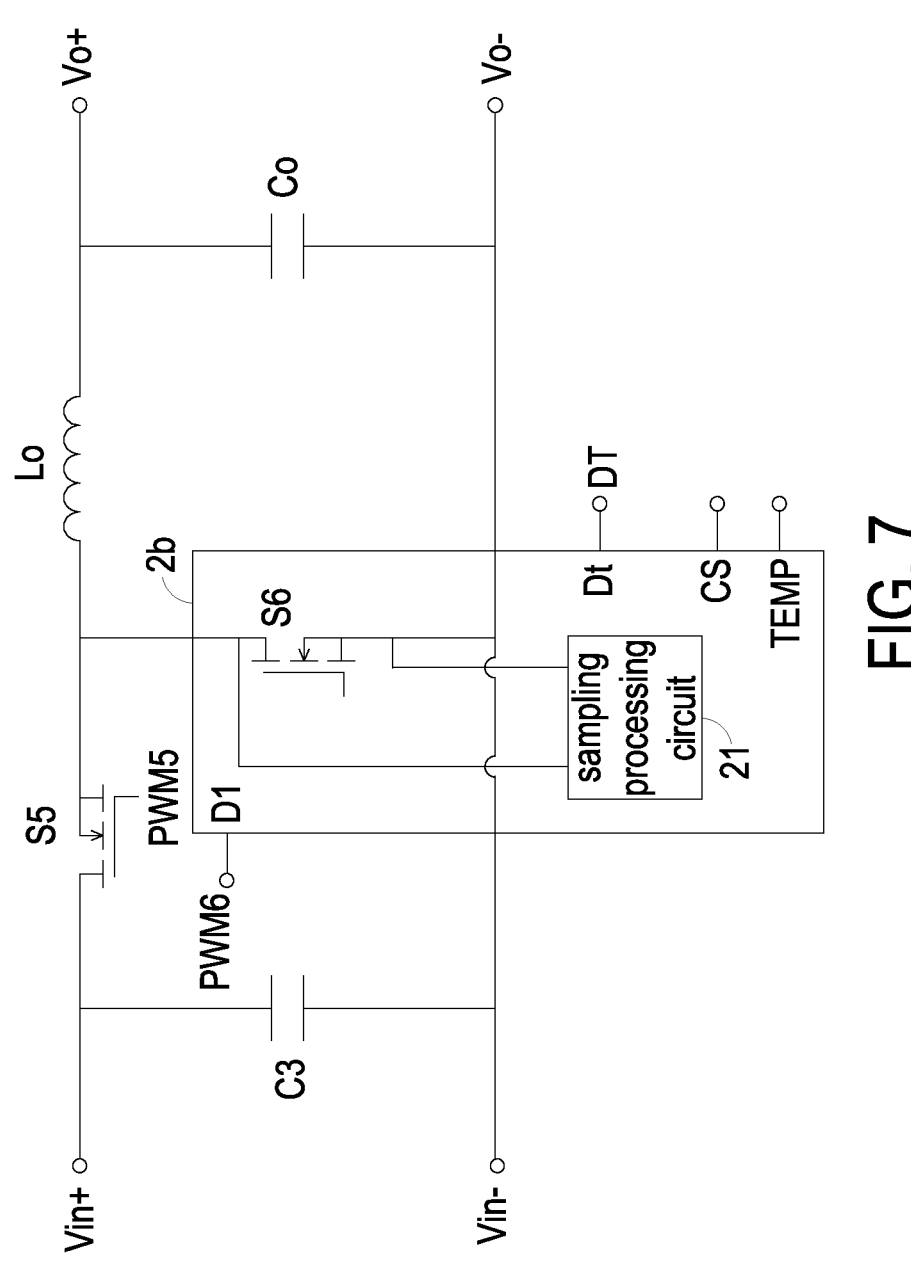
FIG. 7 is a schematic circuit diagram illustrating a converter and an integrated circuit thereof according to a second embodiment of the present disclosure.

Please refer to FIG. 7. FIG. 7 is a schematic circuit diagram illustrating a converter and an integrated circuit thereof according to a second embodiment of the present disclosure. As shown in FIG. 7, the converter 1b includes a positive input terminal Vin+, a negative input terminal Vin−, an input capacitor C3, a switch S5, an integrated circuit 2b, an output inductor Lo, an output capacitor Co, a positive output terminal Vo+ and a negative output terminal Vo−. The input capacitor C3 is electrically connected between the positive input terminal Vin+ and the negative input terminal Vin−. The switch S5 and the output inductor Lo are electrically connected in series between the positive input terminal Vin+ and the positive output terminal Vo+. The output capacitor Co is electrically connected between the positive output terminal Vo+ and the negative output terminal Vo−. The integrated circuit 2b includes a switch S6 and a sampling processing circuit 21. The function and structure of the sampling processing circuit 21 are the same as that described in the above embodiments, and thus the detailed descriptions thereof are omitted herein. A first terminal of the switch S6 is electrically connected to a junction node between the switch S5 and the output inductor Lo, and a second terminal of the switch S6 is electrically connected to the negative input terminal Vin− and the negative output terminal Vo−.

Figure 8:
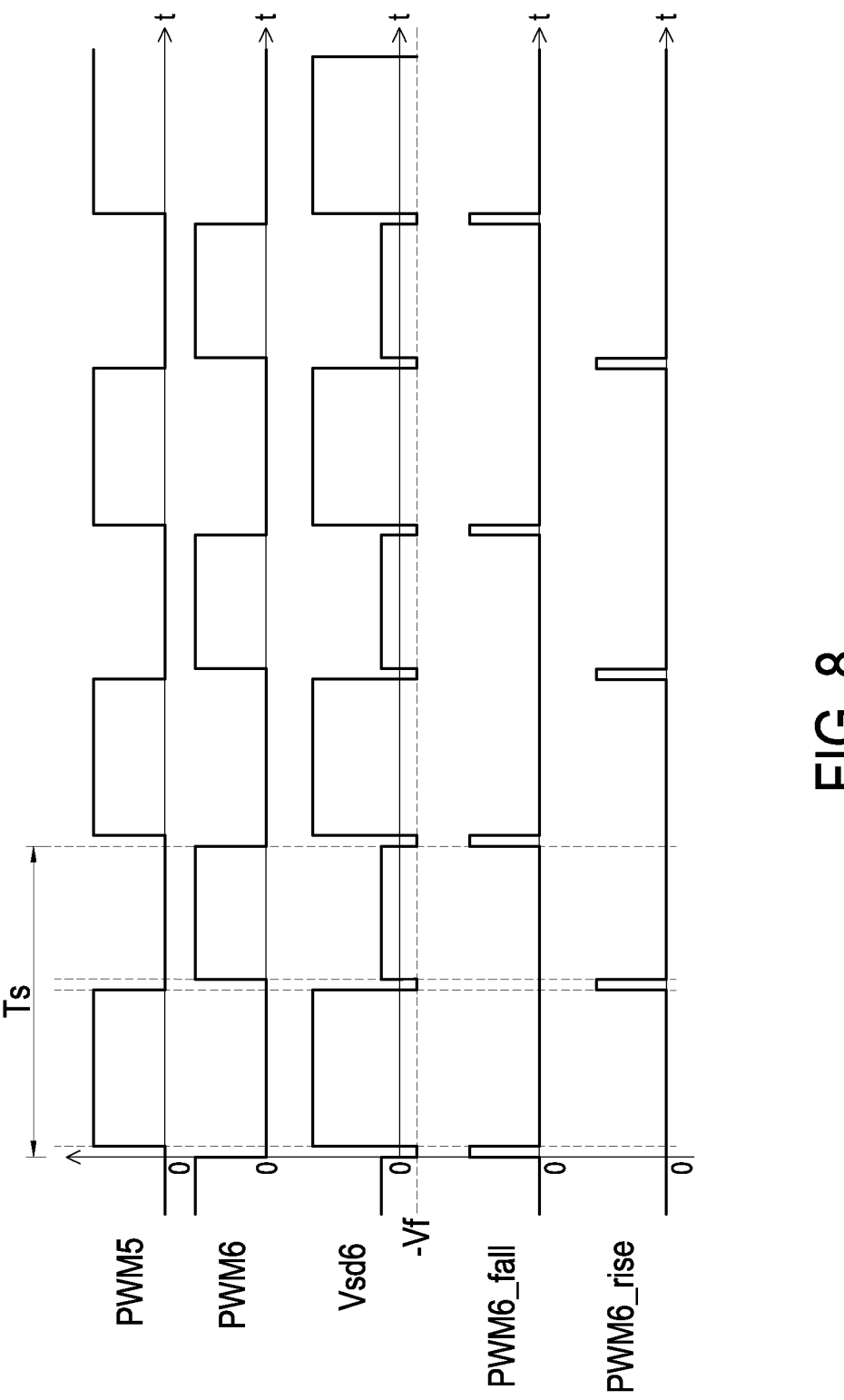
FIG. 8 is a schematic timing waveform diagram illustrating associated voltage signals and PWM signals in the converter of FIG. 7.

Please refer to FIG. 8. FIG. 8 is a schematic timing waveform diagram illustrating associated voltage signals and PWM signals in the converter of FIG. 7. As shown in FIG. 8, the control signal PWM5 of the switch S5 is complementary to the control signal PWM6 of the switch S6. The sampling processing circuit 21 generates two pulse signals PWM6_fall and PWM6_rise by sampling the source-drain voltage Vsd6 of the switch S6. The pulse signal PWM6_fall reflects the duration of the dead time at the falling edge of the control signal PWM6, and the pulse signal PWM6_rise reflects the duration of the dead time at the rising edge of the control signal PWM6. The sampling processing circuit 21 can generate a digital signal based on the pulse signals PWM6_fall and PWM6_rise, and the controller of the converter 1b adjusts the durations of the dead times of the control signal PWM6 according to the digital signal. The specific process is similar to that described in the foregoing embodiments, and thus the detailed descriptions thereof are omitted herein.

Figure 9:
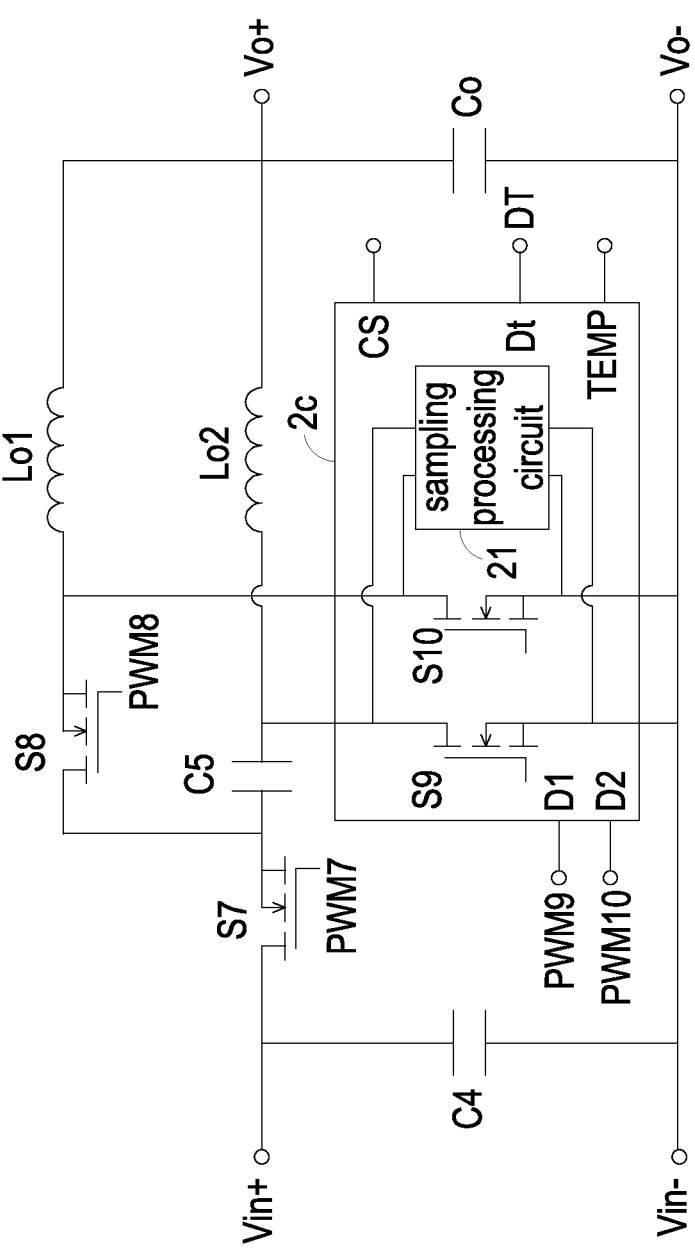
FIG. 9 is a schematic circuit diagram illustrating a converter and an integrated circuit thereof according to a third embodiment of the present disclosure.

Please refer to FIG. 9. FIG. 9 is a schematic circuit diagram illustrating a converter and an integrated circuit thereof according to a third embodiment of the present disclosure. As shown in FIG. 9, the converter 1c includes a positive input terminal Vin+, a negative input terminal Vin–, an input capacitor C4, switches S7 and S8, an intermediate capacitor C5, an integrated circuit 2c, output inductors Lo1 and Lo2, an output capacitor Co, a positive output terminal Vo+, and a negative output terminal Vo–. The input capacitor C4 is electrically connected between the positive input terminal Vin+ and the negative input terminal Vin–. The switch S7, the intermediate capacitor C5, and the output inductor Lo2 are electrically connected in series between the positive input terminal Vin+ and the positive output terminal Vo+. The switch S8 and the output inductor Lo1 are electrically connected in series between a junction node of the switch S7 and the intermediate capacitor C5 and the positive output terminal Vo+. The output capacitor Co is electrically connected between the positive output terminal Vo+ and the negative output terminal Vo–. The integrated circuit 2c includes switches S9 and S10 and a sampling processing circuit 21. The function and structure of the sampling processing circuit 21 are the same as that described in the above embodiments, and thus the detailed descriptions thereof are omitted herein. A first terminal of the switch S9 is electrically connected to a junction node between the intermediate capacitor C5 and the output inductor Lo2, and a second terminal of the switch S9 is electrically connected to the negative input terminal Vin– and the negative output terminal Vo–. A first terminal of the switch S10 is electrically connected to a junction node between the switch S8 and the output inductor Lo1, and a second terminal of the switch S10 is electrically connected to the negative input terminal Vin– and the negative output terminal Vo–.

Figure 10:
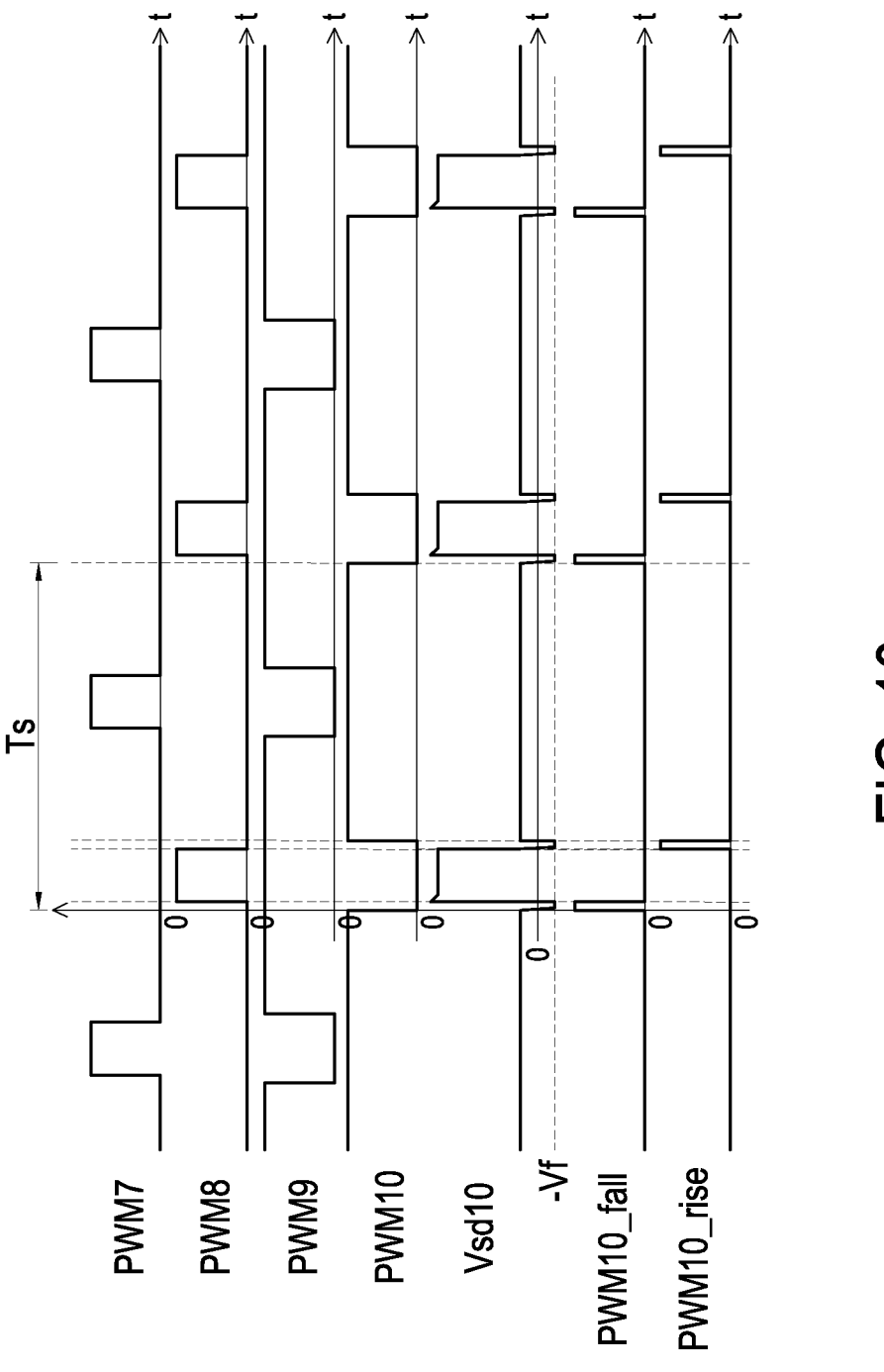
FIG. 10 is a schematic timing waveform diagram illustrating associated voltage signals and PWM signals in the converter of FIG. 9.

Please refer to FIG. 10. FIG. 10 is a schematic timing waveform diagram illustrating associated voltage signals and PWM signals in the converter of FIG. 9. As shown in FIG. 10, the control signal PWM7 of the switch S7 is complementary to the control signal PWM9 of the switch S9, and the control signal PWM8 of the switch S8 is complementary to the control signal PWM10 of the switch S10. Taking the switch S10 as an example, the sampling processing circuit 21 generates two pulse signals PWM10_fall and PWM10_rise by sampling the source-drain voltage Vsd10 of the switch S10. The pulse signal PWM10_fall reflects the duration of the dead time at the falling edge of the control signal PWM10, and the pulse signal PWM10_rise reflects the duration of the dead time at the rising edge of the control signal PWM10. The sampling processing circuit 21 may generate a digital signal based on the pulse signals PWM10_fall and PWM10_rise, and the controller of the converter 1c adjusts the durations of the dead times in the control signal PWM10 according to the digital signal. The specific process is similar to that described in the foregoing embodiments, and thus the detailed descriptions thereof are omitted herein.

Based on the above, in the present disclosure, an integrated circuit and a converter including the integrated circuit are provided. The duration of the dead time in the control signal of the switch of the integrated circuit is obtained through sampling the voltage on the switch, and the digital signal is generated accordingly. Therefore, the duration of the dead time can be controlled and adjusted based on the digital signal, thereby reducing the loss caused by the dead time and improving the efficiency of the converter.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An integrated circuit applicable for a converter comprising a first switch, the integrated circuit comprising:
   a second switch, wherein a control signal of the second switch and a control signal of the first switch are complementary, and the control signal of the second switch has a dead time; and
   a sampling processing circuit for sampling a voltage on the second switch to obtain a duration of the dead time, and generating a digital signal according to the duration of the dead time, wherein the digital signal is used to adjust the duration of the dead time.

2. The integrated circuit according to claim 1, wherein the sampling processing circuit comprises a sampling circuit, a signal conversion circuit, and a comparison circuit electrically connected to each other, the sampling circuit samples the voltage on the second switch to generate a pulse signal reflecting the duration of the dead time, the signal conversion circuit converts the pulse signal into a voltage signal reflecting the duration of the dead time, the comparison circuit compares the voltage signal with a threshold to generate the digital signal, a controller of the converter is electrically connected to the comparison circuit, and the controller controls the control signals of the first switch and the second switch according to the digital signal to adjust the duration of the dead time.

3. The integrated circuit according to claim 2, wherein the sampling circuit converts the pulse signal into the voltage signal by integrating operation, and a magnitude of the voltage signal is proportional to the duration of the dead time.

4. The integrated circuit according to claim 2, wherein the comparison circuit comprises a comparator and a register, the comparator is configured to compare the voltage signal with the threshold and generate a deadtime regulating command according to a comparison result, the deadtime regulating command is stored in the register, and the digital signal generated by the comparison circuit comprises all of the deadtime regulating commands stored in the register.

5. The integrated circuit according to claim 4, wherein the threshold comprises an upper threshold and a lower threshold, the upper threshold is greater than the lower threshold; when the voltage signal is less than the lower threshold, the controller increases the duration of the dead time; when the voltage signal is between the lower threshold and the upper threshold, the duration of the dead time is maintained; and when the voltage signal is greater than the upper threshold, the controller decreases the duration of the dead time.

6. The integrated circuit according to claim 4, wherein when the voltage signal is less than the threshold, the controller increases the duration of the dead time; when the voltage signal is greater than the threshold, the controller decreases the duration of the dead time; and the comparator comprises a hysteresis circuit.

7. The integrated circuit according to claim 2, wherein the voltage signal comprises a first voltage signal and a second voltage signal, the first voltage signal reflects the duration of the dead time at a rising edge of the control signal of the second switch, and the second voltage signal reflects the duration of the dead time at a falling edge of the control signal of the second switch.

8. The integrated circuit according to claim 2, wherein the voltage signal reflects the duration of the dead time at a rising edge and a falling edge of the control signal of the second switch.

9. The integrated circuit according to claim 2, wherein the threshold is a preset value, and the digital signal generated correspondingly and used to adjust the duration of the dead time is substantially equal to a preset duration.

10. The integrated circuit according to claim 2, wherein the threshold comprises an upper threshold and a lower threshold, the digital signal generated correspondingly and used to adjust the duration of the dead time falls within a preset range defined by the upper threshold and the lower threshold.

11. The integrated circuit according to claim 1, wherein the converter comprises a plurality of the first switches, the integrated circuit comprises a plurality of the second switches corresponding to the plurality of first switches respectively, control signals of the first switch and the second switch corresponding to each other are complementary and the control signal of the second switch has a dead time, the sampling processing circuit samples a voltage on each of the plurality of second switches to obtain a duration of the dead time corresponding to each of the plurality of second switches, and the sampling processing circuit generates the digital signal according to the durations of the dead times corresponding to the plurality of second switches, wherein the digital signal is used to adjust the durations of the dead times corresponding to the plurality of second switches.

12. The integrated circuit according to claim 1, further comprising a driving pin electrically connected to the second switch, wherein the driving pin is configured to receive the control signal of the second switch; the integrated circuit further has a digital signal pin electrically connected to the sampling processing circuit, and the digital signal pin is configured to output the digital signal.

13. The integrated circuit according to claim 1, wherein the sampling processing circuit comprises a current sampling circuit, the integrated circuit has a current pin electrically connected to the current sampling circuit, the current sampling circuit samples a current flowing through the second switch to generate a current signal, and the current pin is configured to output the current signal.

14. The integrated circuit according to claim 1, wherein the sampling processing circuit comprises a temperature detection circuit, the integrated circuit has a temperature pin electrically connected to the temperature detection circuit, the temperature detection circuit detects a temperature of the second switch to generate a temperature signal, and the temperature pin is configured to output the temperature signal.

15. A converter, comprising:
a positive input terminal, a negative input terminal, a positive output terminal and a negative output terminal, wherein the positive input terminal and the negative input terminal are configured to receive an input signal, and the positive output terminal and the negative output terminal are configured to output an output signal;
a first switch, electrically connected to the positive input terminal; and
an integrated circuit, comprising:
a second switch, wherein a control signal of the second switch and a control signal of the first switch are complementary, and the control signal of the second switch has a dead time; and
a sampling processing circuit for sampling a voltage on the second switch to obtain a duration of the dead time, and generating a digital signal according to the duration of the dead time, wherein the digital signal is used to adjust the duration of the dead time,
wherein the second switch of the integrated circuit is electrically connected to the negative output terminal, and the converter is configured to convert the input signal into the output signal.

16. The converter according to claim 15, comprising:
two first switches, electrically connected in series between the positive input terminal and the negative input terminal, wherein a first one and a second one of the two first switches are electrically connected to the positive input terminal and the negative input terminal respectively;
two input capacitors, electrically connected in series between the positive input terminal and the negative input terminal; and
a transformer having a primary winding and a secondary winding, wherein a first terminal of the primary winding is electrically connected to a junction node between the two first switches, and a second terminal of the primary winding is electrically connected to a junction node between the two input capacitors,
wherein the integrated circuit comprises two second switches, a first one of the two second switches is electrically connected between a first terminal of the secondary winding and the negative output terminal, a second terminal of the secondary winding is electrically connected to the positive output terminal, a second one of the two second switches is electrically connected between a third terminal of the secondary winding and the negative output terminal, a control signal of the first one of the two second switches and a control signal of the first one of the two first switches are complementary and the control signal of the first one of the two second switches has a first dead time, and a control signal of the second one of the two second switches and a control signal of the second one of the two first switches are complementary and the control signal of the second one of the two second switches has a second dead time,
wherein the sampling processing circuit samples voltages on the two second switches to obtain durations of the first dead time and the second dead time corresponding to the two second switches, the sampling processing circuit generates the digital signal according to the durations of the first dead time and the second dead time corresponding to the two second switches, and the digital signal is used to adjust the durations of the first dead time and the second dead time corresponding to the two second switches.

17. The converter according to claim 15, further comprising an input capacitor, an output inductor, and an output capacitor, wherein the input capacitor is electrically connected between the positive input terminal and the negative input terminal, the first switch and the output inductor are electrically connected in series between the positive input terminal and the positive output terminal, the output capacitor is electrically connected between the positive output terminal and the negative output terminal, a first terminal of the second switch is electrically connected to a junction node between the first switch and the output inductor, and a second terminal of the second switch is electrically connected to the negative input terminal and the negative output terminal.

18. The converter according to claim 15, wherein the converter comprises an input capacitor, two first switches, an intermediate capacitor, an output capacitor, a first output inductor and a second output inductor, and the integrated circuit comprises two second switches;

wherein the input capacitor is electrically connected between the positive input terminal and the negative input terminal, a first one of the two first switches, the intermediate capacitor and the second output inductor are electrically connected in series between the positive input terminal and the positive output terminal, a second one of the two first switches and the first output inductor are electrically connected in series between the positive output terminal and a junction node of the first one of the two first switches and the intermediate capacitor, and the output capacitor is electrically connected between the positive output terminal and the negative output terminal;

wherein a first terminal of a first one of the two second switches is electrically connected to a junction node between the intermediate capacitor and the second output inductor, a second terminal of the first one of the two second switches is electrically connected to the negative input terminal and the negative output terminal, a first terminal of a second one of the two second switches is electrically connected to a junction node between the second one of the two first switches and the first output inductor, and a second terminal of the second one of the two second switches is electrically connected to the negative input terminal and the negative output terminal;

wherein a control signal of the first one of the two second switches and a control signal of the first one of the two first switches are complementary and the control signal of the first one of the two second switches has a first dead time, and a control signal of the second one of the two second switches and a control signal of the second one of the two first switches are complementary and the control signal of the second one of the two second switches has a second dead time;

wherein the sampling processing circuit of the integrated circuit samples voltages on the two second switches to obtain durations of the first dead time and the second dead time corresponding to the two second switches, the sampling processing circuit generates the digital signal according to the durations of the first dead time and the second dead time corresponding to the two second switches, and the digital signal is used to adjust the durations of the first dead time and the second dead time corresponding to the two second switches.

* * * * *